April 13, 1965
R. L. KONKLE
3,177,664
HYDRO-PNEUMATIC SYSTEM
Filed Nov. 29, 1963
6 Sheets-Sheet 1
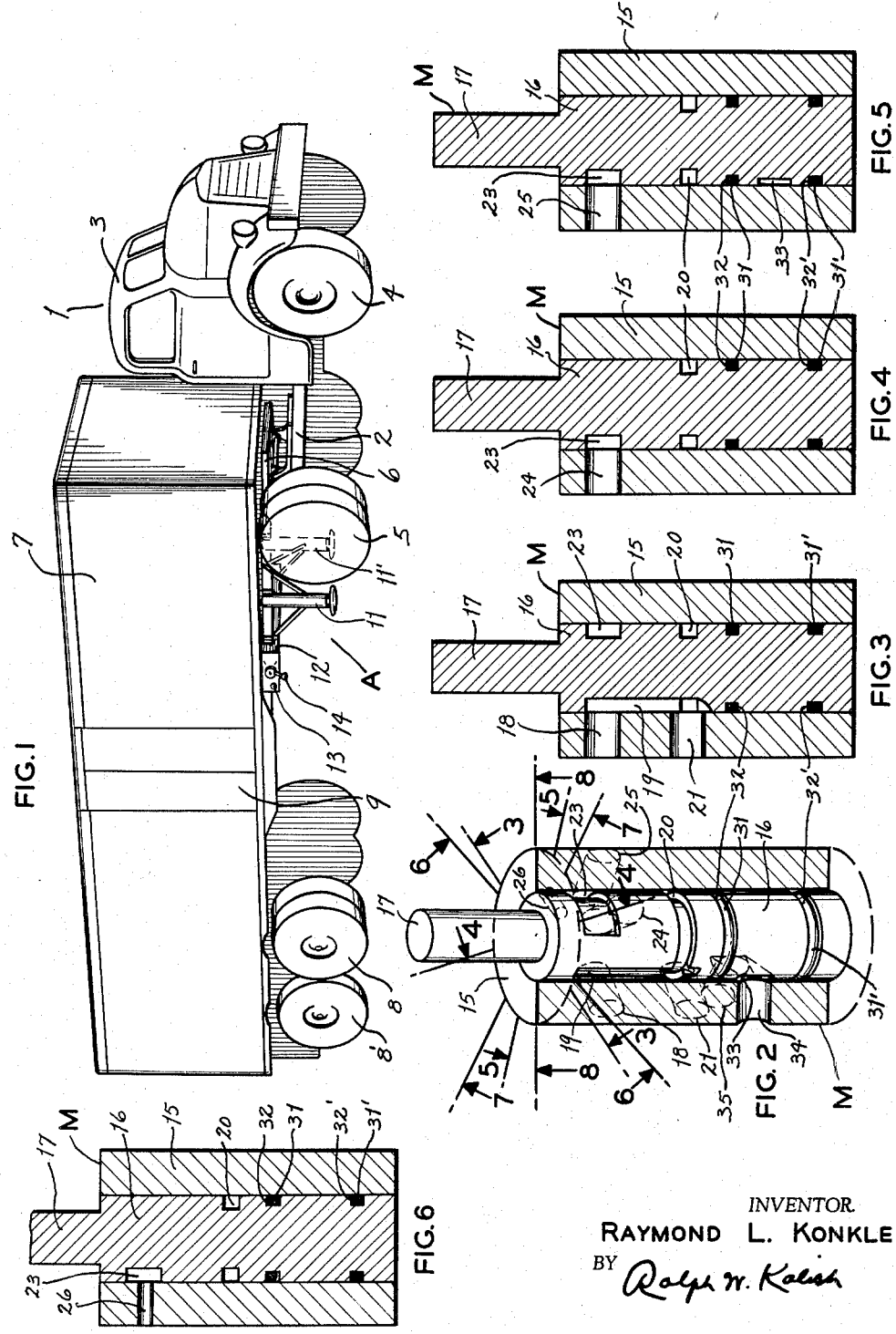
INVENTOR.
RAYMOND L. KONKLE
BY
ATTORNEY

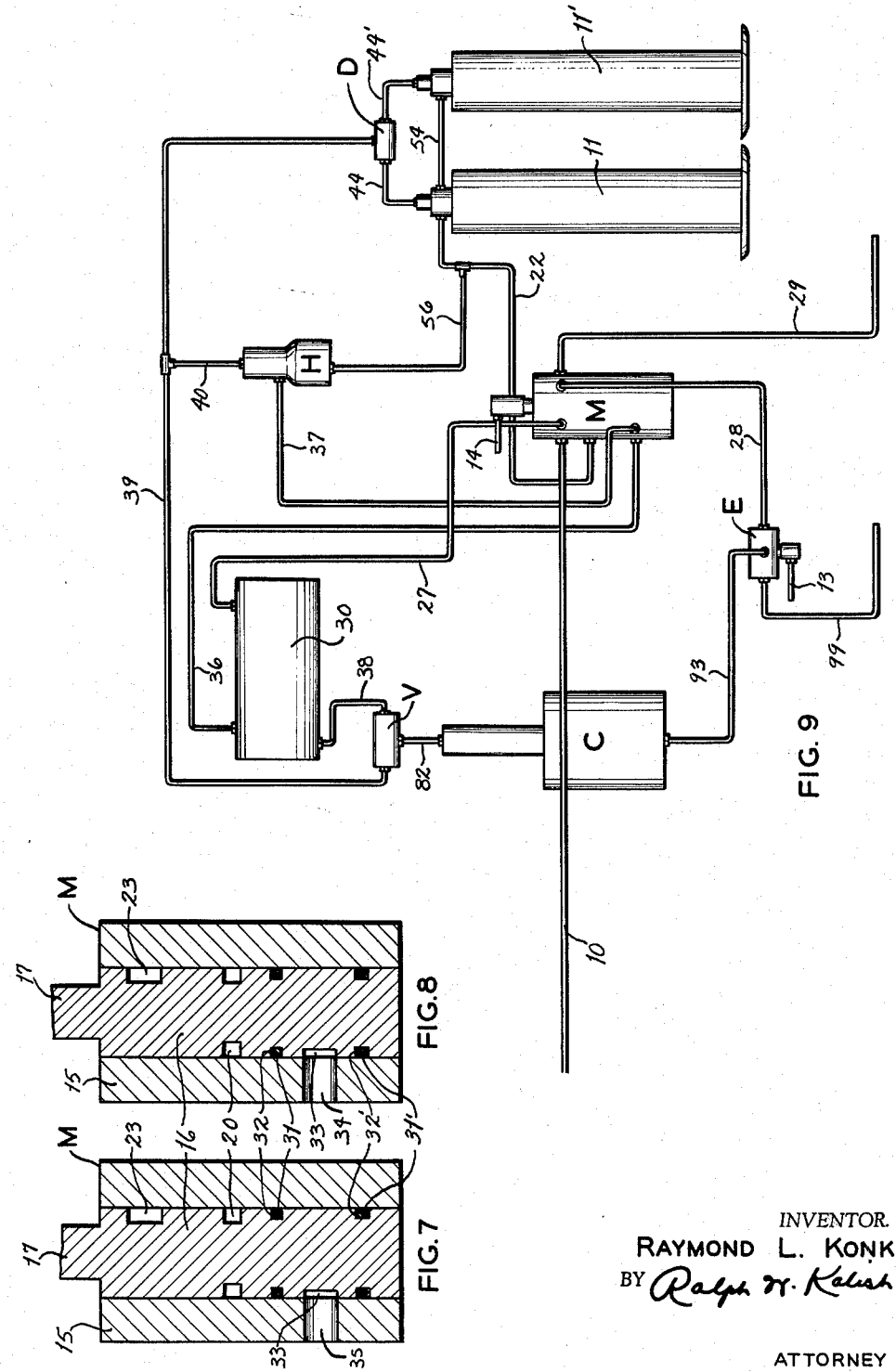

INVENTOR.
RAYMOND L. KONKLE
BY Ralph W. Kalish
ATTORNEY

FIG. II

INVENTOR.
RAYMOND L. KONKLE

United States Patent Office 3,177,664
Patented Apr. 13, 1965

3,177,664
HYDRO-PNEUMATIC SYSTEM
Raymond L. Konkle, Clinton, Iowa, assignor to Central Steel Tube Company, Clinton, Iowa, a corporation of Iowa
Filed Nov. 29, 1963, Ser. No. 327,028
5 Claims. (Cl. 60—51)

This invention relates in general to systems operated by fluids under pressure, and, more particularly, to a hydro-pneumatic system.

It is an object of the present invention to provide a liquid, such as hydraulic oil, motivated by a pressurized gas such as air.

It is another object of the present invention to provide a hydro-pneumatic system incorporating means for increasing or stepping up the operating pressure of the gas above that of the line pressure therefor.

It is a still further object of the present invention to provide a landing gear for tractor-trailer combinations operated by the hydro-pneumatic system of the present invention whereby the motivating gas may be obtained from the air brake system of the tractor.

It is another object of the present invention to provide a tractor-trailer landing gear of the type stated wherein novel means are presented for increasing the pressure applied upon the hydraulic liquid at any desired multiple of the line pressure of the air in the tractor brake system so that requisite force is provided for independently and reliably supporting the trailer together with its load.

It is another object of the present invention to provide a landing gear system for tractor-trailer combinations which includes conveniently accessible, manually controlled operating valves for expeditious setting so that extension and retraction of the landing gear may be effected with minimum effort on the part of the user and which do not require developed skill for operation thereof.

It is a further object of the present invention to provide a landing gear system of the type stated which incorporates novel valve means for conducing to the efficient and rapid operation of the system as well as for assuring of complete safety of the system in any selected condition so that accidental unauthorized movement of the supporting legs is prevented.

It is a still further object of the present invention to provide a tractor-trailer landing gear system which is comprised of a minimum of parts and hence is resistant to breakdown; which system may be easily provided upon existing tractors without requiring costly structural modification thereof; which system in operation is entirely automatic and thus obviates arduous physical effort by tractor personnel; which system may be economically produced; and which system is durable in operation.

Other objects and details of the invention will be apparent from the following description, when read in connection with the accompanying drawings (six sheets) wherein—

FIGURE 1 is a perspective view of a tractor-trailer combination having mounted thereon a trailer landing gear system made in accordance with and embodying the present invention.

FIGURE 2 is a perspective view of the master control valve with the casing therefor being partly sectioned and the remainder shown in dotted lines, said valve being shown in landing gear retracted position.

FIGURE 3 is a vertical transverse section taken on the line 3—3 of FIGURE 2.

FIGURE 4 is a vertical transverse section taken on the line 4—4 of FIGURE 2.

FIGURE 5 is a vertical transverse section taken on the line 5—5 of FIGURE 2.

FIGURE 6 is a vertical transverse section taken on the line 6—6 of FIGURE 2.

FIGURE 7 is a vertical transverse section taken on the line 7—7 of FIGURE 2.

FIGURE 8 is a vertical transverse section taken on the line 8—8 of FIGURE 2.

FIGURE 9 is a schematic of the components of the landing gear system.

Figure 10:
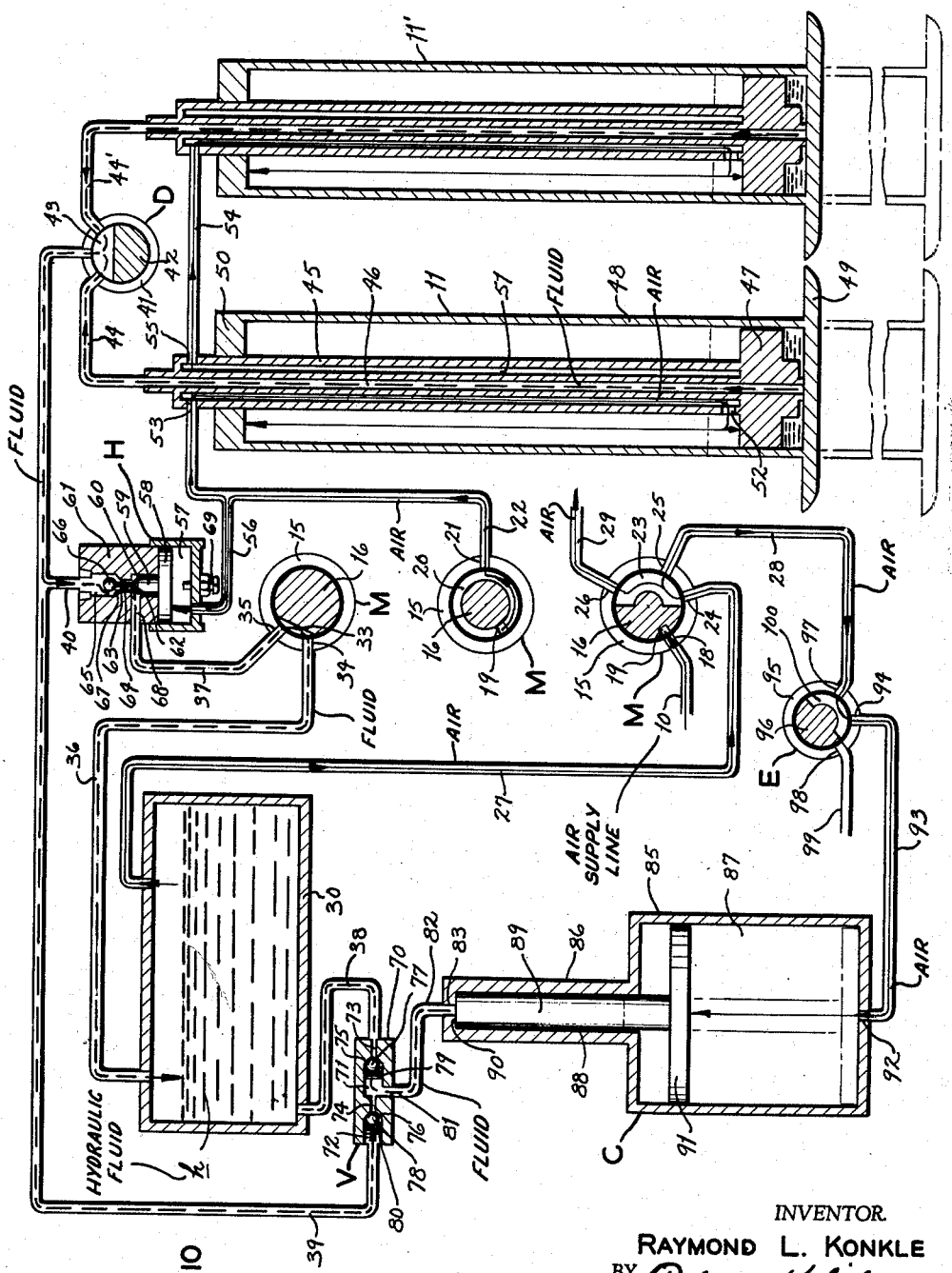
FIGURE 10 is a diagram of the system of the present invention illustrating same with the support legs in retracted position.

Referring now by reference characters to the drawings which illustrate the preferred embodiment of the present invention, A generally designates a hydro-pneumatic system which is shown herein, for purposes of illustration only, as associated with a combination tractor-trailer for operating landing gear therefor, whereby upon disengagement of the tractor, the trailer will be fully and reliably supported, as for unloading and loading operations. A tractor of customary design is indicated 1 and is provided with a frame 2, cab 3, front and rear wheels 4, 5 respectively, and a fifth wheel 6 carried on frame 2 for detachable securement to a load-carrying trailer 7. Said trailer 7 comprises, broadly, rear sets of wheels 8, 8', and a body 9 mounted upon a frame (not shown) as well as means for siutable union with fifth wheel 6. Tractor 1 and trailer 7 are equipped with the usual air brake systems (not shown) wherein the trailer air brakes are adapted for connection to that of the tractor 1, upon coupling therewith, as by suitable valve-controlled service lines, all as is well known in the art. System A of the present invention is engaged to the tractor air brake system so that air under the particular pressure of such latter system is supplied to system A as the motivating force therefor; the connecting or supply line being designated 10 in the drawings.

The landing gear of the present invention comprises basically a pair of extensible and retractable support legs 11, 11', being laterally aligned and mounted dependingly from the forward undersurface of trailer body 9, and a casing 12 carried on said body 9 in immediate adjacency to legs 11, 11' for containing the leg-operating components of the system, and being located for convenient manipulation of hand levers 13, 14. Air supply line 10 is connected to a master control valve M comprising a cylindrical valve housing 15 with an elongated cylindrically shaped valve 16 adapted for pivoting therein by swinging of lever 14 which latter is mounted on an extension 17 of valve 16; there being a port 18 proximate one end of said housing 15 and opening therethrough for effecting communication between air supply line 10 and passages within valve 16. Valve 16 is provided with a longitudinally extending, outwardly opening, milled air passage 19 the outer end of which progresses from a point proximate an end of said valve, being alignable with port 18, while the other or inner end of said passage 19 terminates at a point substantially intermediate the length of valve 16. In its inner end portion, passage 19 is integral with an annular air passage 20 extending about the entire circumference of valve 16; said passage 20 being in registration with a port 21 in valve housing 15 which is connected to an air conduit 22.

Circumferentially spaced from air pasage 19, but aligned with the outer end thereof is a circumferentially extending arcuate air passage 23 formed in valve 16 and being registerable with air inlet port 18, as well as ports 24, 25, and 26 provided in valve housing 15 and respectively in communication with, preferably flexible, conduits 27, 28, and 29; said conduit 27 being connected to the inlet end of an oil (or other hydraulic fluid) supply tank 30; said conduit 28 being engaged to exhaust valve E; and said conduit 29 constituting an exhaust line for release of air to the atmosphere.

Valve 16, proximate its inner end, carries a pair of axially spaced apart, sealing rings 31, 31′ for fluid-tight engagement with the inner wall of valve housing 15; said rings being retained within complementary encircling grooves 32, 32′ respectively, machined in valve 16. Between said rings 31, 31′ valve 16 is provided with a relatively shallow liquid passage 33 cut into valve 16 along a short cord line. Drilled or otherwise formed in housing 15 are circumferentially aligned ports 34, 35 for intercommunication through passage 33; said port 34 being engaged to a liquid supply conduit 36, such as hosing, which latter opens into the inlet end of tank 30; while port 35 is connected by a line 37 to a hydraulic fluid release valve H. At its discharge end, tank 30 is connected by an outlet pipe 38 through a control valve V to a conduit 39 having a branch line 40 to valve H, and leading to a divider valve D having a housing 41 and a valve body 42 rotatable therein. Valve body 42 is provided with a milled groove 43 providing a passage for selected or simultaneous communication with hydraulic lines 44, 44′ to support legs 11, 11′ respectively. Support legs 11, 11′ each comprise a central elongated stationary stem 45 suitably fixed at its upper end to the trailer frame and having an axial passage 46 extending the length thereof, the upper end of which is continuous with related line 44, 44′, as the case may be, and the lower end of which opens through the undersurface of a diametrally enlarged piston 47. The side face of piston 47 is in fluid-proof, sliding relation with the inner annular wall of a hollow cylinder 48 which is closed at its lower end, downwardly of piston 47, by a ground plate or shoe 49, and at its end, upwardly of piston 47, is provided with an end closure 50 centrally apertured for fluid-tight sliding engagement with the outer face of stem 45. Thus hydraulic fluid discharged through piston 47 will operate against the associated ground plate 49 forcing cylinder 48 downwardly until full extension is obtained by abutment of end closure 50 against the upper face of the related piston 47 (see FIGURE 12).

Radially spaced from, and surrounding, axial passage 46, within stem 45, is an annular air chamber 51, the outer wall of which, at its lower end is provided with an orifice 52 immediately adjacent head 47 for communication with the interior of piston 48. The upper end of each air chamber 51 is also provided with an opening 53, which latter are engaged to air conduit 22. For simplicity of construction, the opening 53 of legs 11, 11′ may be connected, as by a line 54 extending between opening 53 of leg 11′ and an aperture 55 in air chamber 51 of leg 11.

Connecting air conduit 22 and hydraulic release valve H is an air line 56 which opens into an air compartment 57 formed in valve H for directing air against one face of a piston head 58 slideable therein and being integral with a diametrally reduced piston stem 59 extending from the opposite face of said head and being received within a bore 60 provided in body 61 of valve H. In its end portion remote from head 58, stem 59 is tapered, as at 62, and is in continuity with a co-axial narrow rod portion 63 projecting slideably through orifice 64 which communicates with one end of a liquid chamber 65 connected at its other end to branch line 40. The end extremity of rod portion 63 is adapted to engage a ball valve 66 having a tapered valve seat 67. Thus, ball valve 66 will normally be in valve-closed condition by virtue of the pressure of hydraulic fluid within line 39, branch line 40, and chamber 65. However, unseating of ball valve 66 by rod 63 upon travel of piston head 58 toward said ball valve will open valve H, so that fluid may flow through orifice 64 for discharge from said valve by conduit 37 after traversing a lateral passage 68 formed in valve body 61. Adjusting screw 69 is used to release ball check valve 66 manually in case air pressure is not available and the unit must be operated.

Valve V comprises a valve body 70 having a pair of fluid chambers 71, 72 the former communicating through a port 73 in its outer end wall with tank outlet pipe 38 and the latter being connected at its outer end, as by suitable union, with conduit 39, said chambers 71, 72 inter-connected at their inner ends by a passage 74 of relatively reduced cross section. The outer end wall of chamber 71 and the inner end wall of chamber 72, surroundingly of port 73 and passage 74 respectively, are tapered, as at 75, 76 respectively, to provide valve seats for ball check valves 77, 78 respectively, which latter are urged into closed condition by coil springs 79, 80 respectively. Chamber 72 communicates through a lateral port 81 with one end of line 82 which at its other end opens into a port 83 provided in the proximate end wall of a booster cylinder C. Said cylinder C is comprised of an enlarged section 85 and a relatively reduced section 86 which sections are co-axial and internally continuous, defining compartments 87, 88 respectively. Presented for axial slideable movement within cylinder C is a piston 89 having an outside diameter substantially equal to the inside diameter of compartment 88 for fluid-proof relationship with the inner wall thereof so that hydraulic fluid entering said compartment through port 83 will act against the adjacent end face 90 of piston 89 for effecting movement thereof. Piston 89 is of greater length than compartment 88 (see FIGURE 10) so that at its other end it will project into compartment 87 and such end mounts a head 91 having a diameter substantially equal to the inside diameter of compartment 87 for slideable movement therein. It is apparent that packing rings (not shown) may be mounted on piston 89 and head 91 to assure proper sealing engagement with the cooperating cylinder walls. Opening into enlarged compartment 87 through the end wall thereof is an air port 92 which is connected by an air conduit 93 to valve E; said conduit 93 being secured within a port 94 in valve body 95 of said valve E which includes a valve stem 96 rotatably mounted within valve body 95 and being selectedly positionable therein by operation of lever 13.

Valve E is also provided with ports 97, 98 respectively, connected to conduit 28 and an exhaust line 99. Valve stem 96 is formed to present an arcuate, circumferentially directed passage 100 of such extent to permit registration with ports 94 and 97 or ports 94 and 99.

The differential in radius between piston 89 and head 91, operating within their respective compartments 88, 87, is of criticality in the effective operation of the present invention. Such differential allows for a stepping-up or "boosting" of the air pressure operating against hydraulic fluid $h$ to a value above that of the line pressure in the air brake system of the tractor. Thus, for instance, if the radius of piston 89 is one inch and that of head 91 is five inches, an increase in pressure in a ratio of 25 to 1 will be effected since the resulting pressure will vary directly as the square of the radii of said piston 89 and head 91. If the air pressure operating against head 91 is 100 lbs./sq. inch, being the line pressure, then piston 89, with a one inch radius, will exert a pressure of 2500 lbs. against fluid $h$ in chamber 88. It is apparent that any selected ratio of radii may be utilized depending upon the resultant pressure desired. As the description of the workings of the present invention set forth below will reveal, the increasing of the pressure applied upon the hydraulic fluid *h* by the novel construction and function of cylinder C assures of the consistent reliability of operation of the present invention and of the ready adaptation of the same for use with existing air systems regardless of the particular line pressures therein.

The operation of the present invention is as follows:

With trailer 7 being towed by tractor 1, landing gear support legs 11, 11', will, understandably, be in upward or retracted position, as shown in FIGURE 1, and with the components of the system being in the positions indicated in FIGURE 10 to which reference will now be made. It will be seen that valve 16 of master control valve M relates to its housing 15 in the same manner as shown in FIGURES 2 through 8 inclusive, whereby air flowing through supply line 10 is directed into passage 19, thence along passage 20 and conduit 22 for admission into air chambers 51 of stems 45; flowing outwardly through orifices 52 for filling the surrounding volume of cylinders 48 which latter are thereby maintained in upward position by force of the line pressure of the air acting against the under face of end closure 50. In this condition, ground plates 49 abut against the lower end of stem heads 47. Air is directed against piston head 58 for maintaining same in valve-open state with valve 66 unseated so that in view of the disposition of valve 16, supply tank 30 for hydraulic fluid *h* is in communication through divider valve D with passages 46 of stems 45. With the landing gear retracted, exhaust valve E and master control valve M are set to prevent loss of air from the system via conduits 99 and 29 respectively in order to assure the reliable holding of cylinders 48 against inadvertent, accidental descent.

Figure 11:
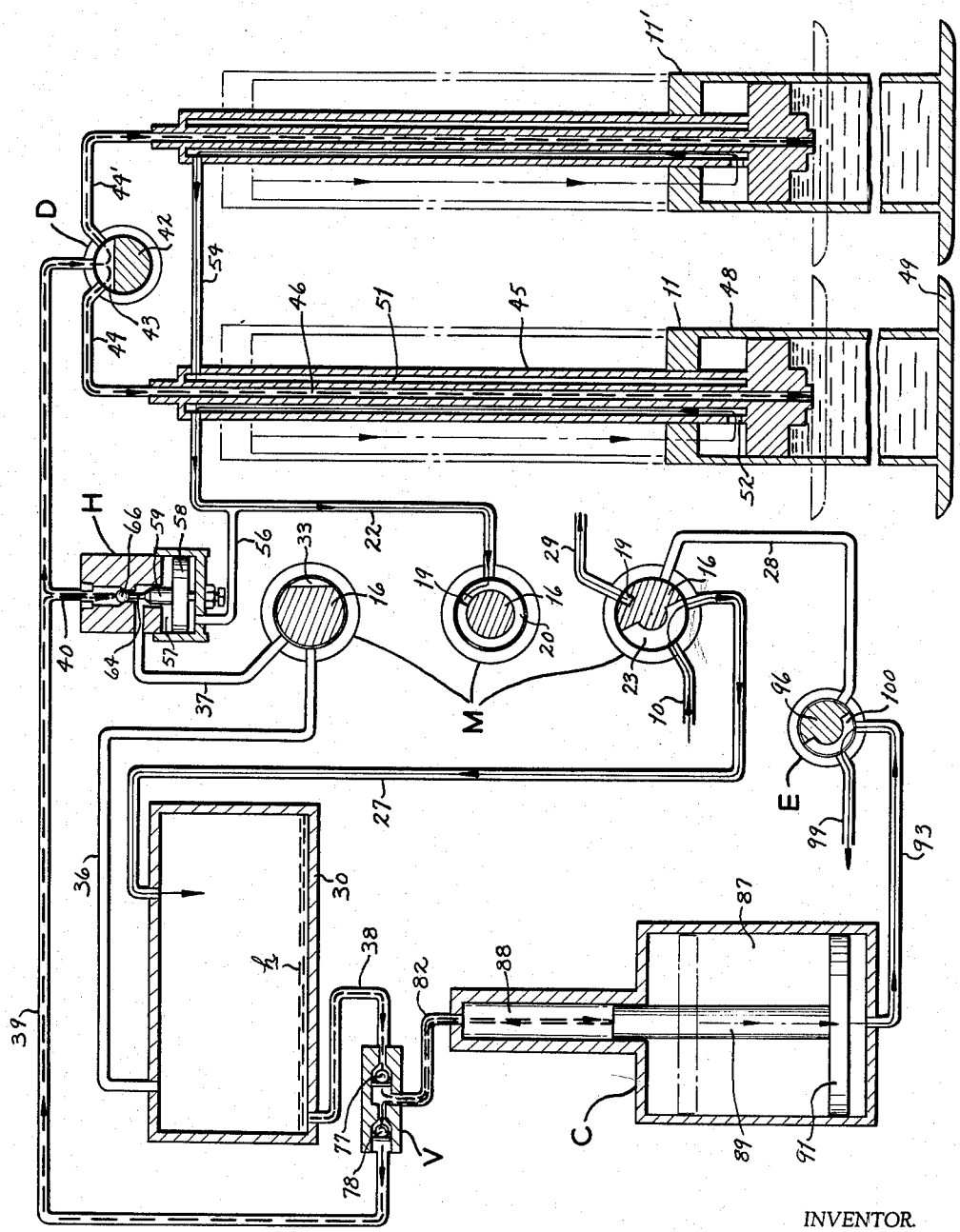
FIGURE 11 is a diagram of the system in the course of movement of the supporting legs into trailer-supporting or extended position.

When it is desired to disconnect trailer 7, after it has reached its destination, as for loading or unloading, necessitating such an amount of time as to make it undesirable to retain tractor 1 in coupled relation, master control valve M may be operated by simple manipulation of hand lever 14 into the position shown in FIGURE 11 to effect flow of hydraulic fluid *h* for forcing cylinders 48 of landing gear support legs 11, 11' into extended or trailer-supporting position. Referring now to FIGURE 11, it will be seen that by such operation of master control valve M, air entering the system through supply line 10 is directed along passage 23, thence through conduit 27 to tank 30 for applying the force of the line pressure upon hydraulic fluid *h* therein for discharge of the latter through outlet pipe 38. By this particular relationship between valve 16 and its housing 15, air from the supply line 10 is prevented entry into passage 19 which is now in registration with conduit 29 for venting to the atmosphere of air traveling through said passage 19 from conduit 22. Hydraulic fluid *h* flowing from outlet pipe 38 will enter valve V with the applied pressure thereon causing unseating of ball check valve 77 and 78 whereby said fluid *h* flows into line 39 for admission into divider valve D; with fluid *h* entering hydraulic release valve H through branch line 40 for exerting a valve-closing or seating-force upon ball valve 66 whereby flow of hydraulic fluid *h* into conduit 37 is prevented, which conduit, nevertheless, at its other end is effectively closed by the particular positionment of valve 16.

In divider valve D hydraulic fluid *h* is directed along lines 44, 44', then downwardly of passages 46 for emission at the lower end of pistons 47 for flow against the confronting inner face of related ground shoes 49 to cause the respective cylinders 48 to be shifted downwardly into extended position. It will be seen that the force acting against said cylinders 48 for effecting movement thereof, will be that supplied by line pressure in the air brake system, such as 100 lbs./sq. inch. The air displaced in cylinders 48 by the entry of hydraulic fluid *h* therein moves through orifices 52, thence upwardly of air chambers 51 for ultimate flow along conduit 22 for exhausting to the atmosphere by way of passages 29 and 19, and conduit 29, as indicated by arrows. The closure of ball valve 66 under pressure of hydraulic fluid *h* will force piston head 58 into retracted position, causing flow of air from said valve H. It is apparent that inadvertent return flow of hydraulic fluid *h* to tank 30 is blocked by hydraulic valve H and ball check valve 78 of valve V. Cylinders 48 will continue their descent into supporting position until ground plates 49 are brought into contact with the support surface.

Hydraulic fluid *h* in extended cylinders 48 is, at this point, under no greater pressure than that acting thereon by the air in the brake system, and such acting pressure may well be below line pressure. Such fluid force, although sufficient to extend said cylinders 48, may not be adequate to withstand the load of the trailer and its cargo, or to elevate the front end of said trailer to a height requisite for disengagement of fifth wheel 6. In order to insure the stabilization of legs 11, 11' to support the applied load, as well as to raise the proximate end of trailer 7 for uncoupling, a pressure-increasing or so-called jacking operation is carried out by appropriate functioning of exhaust valve E through manipulation of its control lever 13.

Figure 12:
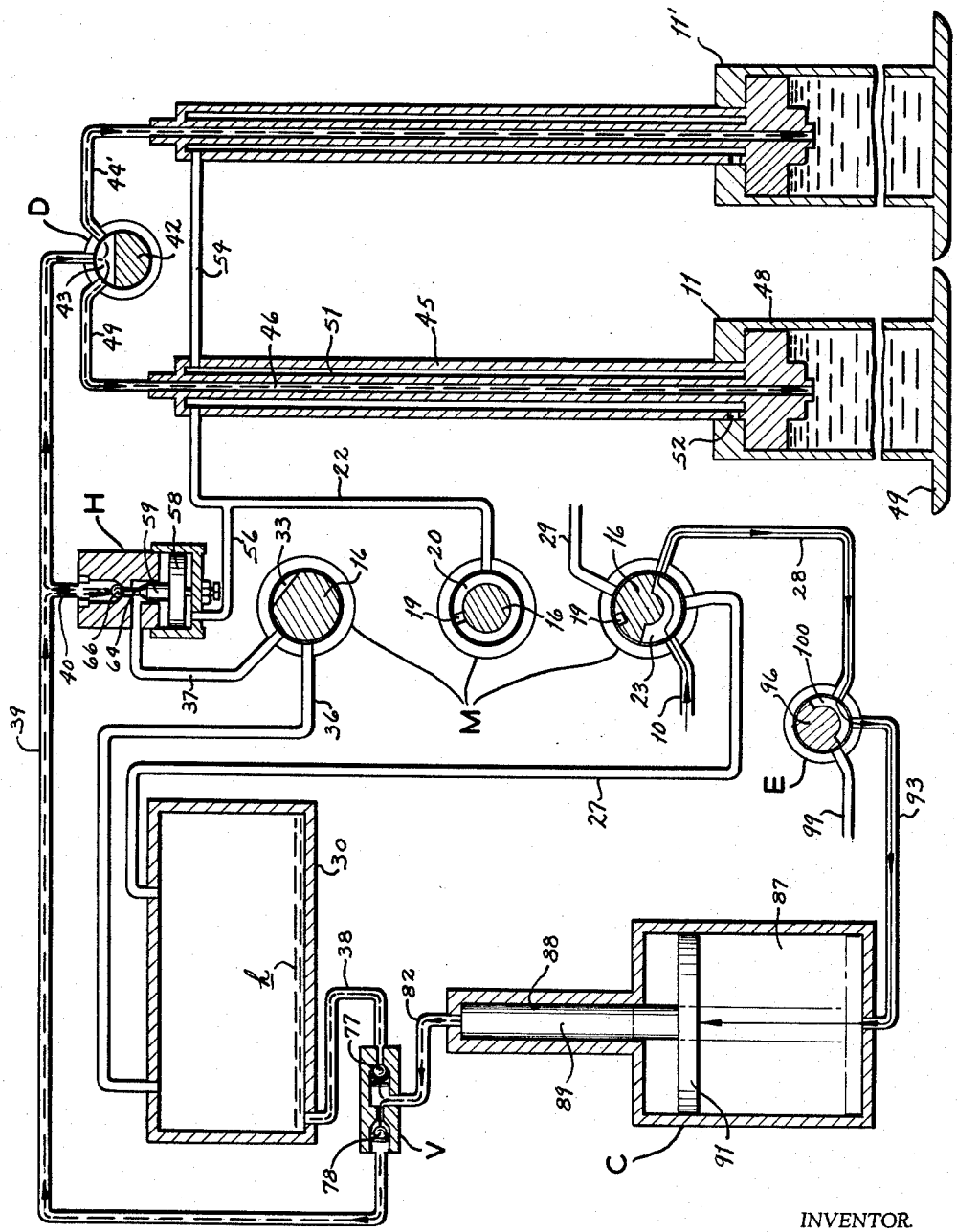
FIGURE 12 is a diagram of the system of the present invention in the first step of the pressure increasing or boosting operation.
Figure 13:
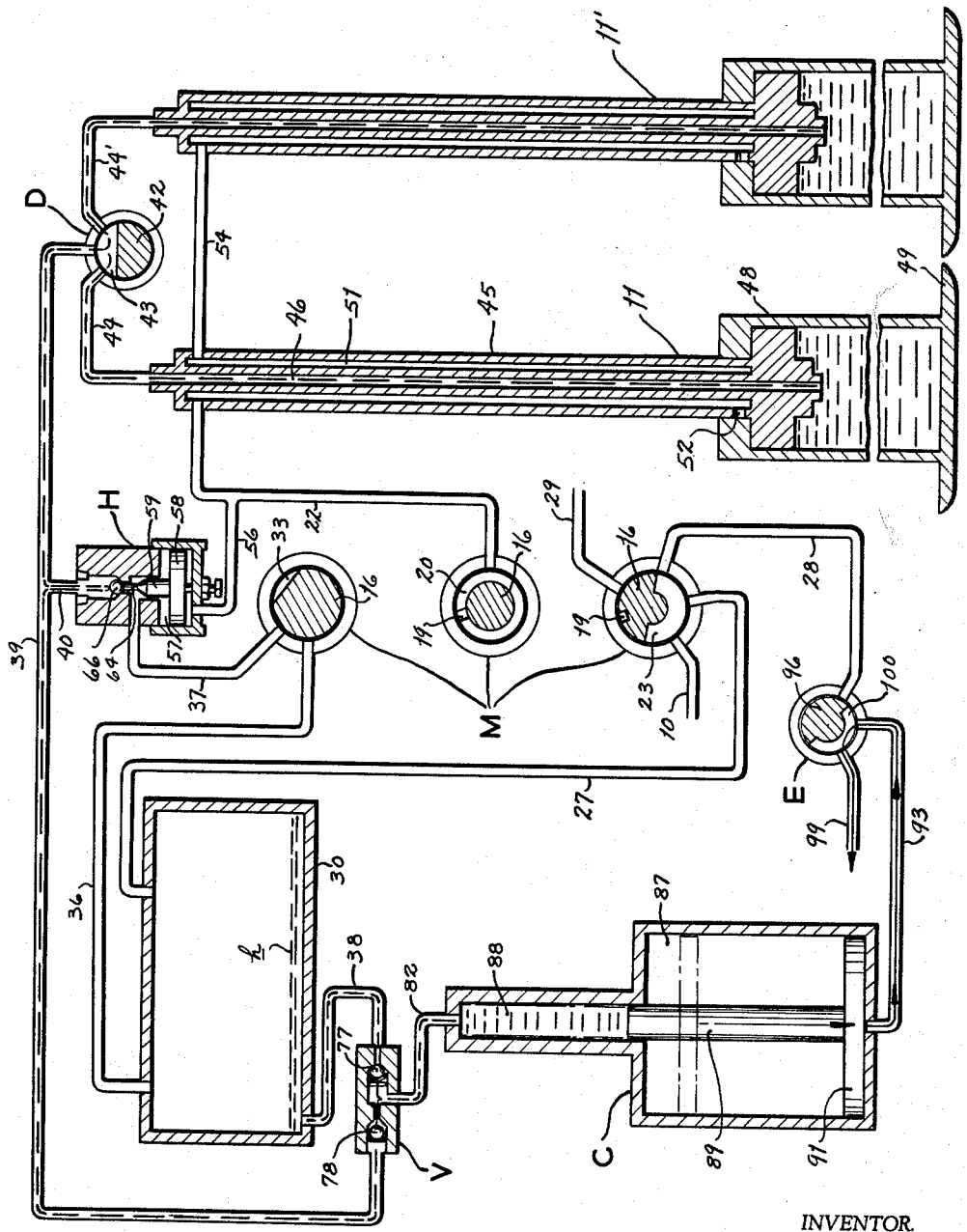
FIGURE 13 is a diagram of the system of the present invention in the second step of the pressure increasing or boosting operation.

Reference is now made to FIGURES 12 and 13 which illustrate sequential stages of the "boosting" operation. Master control valve M is swung so that supply line 10 can be in communication with conduit 28 via passage 23 for flow of air to valve E. Axial passage 19 is closed against reception of air from supply line 10. Valve E is set to close air egress through exhaust line 99 and to direct air through conduit 28, along conduit 93 for admission into compartment 87 of booster cylinder C in order to act against piston head 91. The force of air impinging against piston head 91 causes piston 89 to be moved against hydraulic fluid *h* within compartment 88 but at a considerably greater pressure than that in the tractor air brake system because of the preselected differential in cross sectional area between piston head 91 and piston 89, as above discussed. Thus, the force translated to hydraulic fluid *h* is many times that of the line pressure, such as in the order of 2500 percent if the radii of said piston head 91 and piston 89 are 5 inches and 1 inch respectively. Accordingly, hydraulic fluid *h* is driven through conduit 82 and into valve V for unseating of ball check valve 78, forcing fluid along conduit 39 and into cylinders 48, thereby enhancing the pressure of the fluid *h* in divider valve D and said cylinders 48. It will be observed that ball check valve 77 of valve V and ball valve 66 of valve H will be maintained in closed condition by the pressurized hydraulic fluid. Through this operation, the pressure within cylinders 48 is substantially increased.

This boosting operation is to be repeated for further enhancement of pressure within the extended support legs 11, 11'. In order to accomplish same, valve E is turned into the position shown in FIGURE 13 so that air may be exhausted from booster cylinder C through exhaust line 99, with the prevention of emission of air from supply line 10 being achieved by closure of conduit 28. The pressure theretofore acting against hydraulic fluid *h* within compartment 88 is removed whereby piston 89 is shifted under force of the hydraulic fluid *h* in compartment 88 since such is greater than that of any air in compartment 87 whereby piston head 91 moves into closing relationship with port 92. By the withdrawal of pressure against piston head 91, the hydraulic fluid *h* in conduit 39 will cause ball check valve 78 to be returned to seated or valve-closing condition so that there is no loss of developed pressure within cylinders 48. The operator may then return valve E to the position shown in FIGURE 12 to close exhaust line 99 and connect conduit 28 with conduit 93 for return of air to cylinder C for repeating the operation of forcing hydraulic fluid *h* into cylinders 48 under the increased pressure effected by the functioning of cylinder C. Any residual air that may have been within cylinders 48 is fully evacuated therefrom whereby support legs 11, 11' are in firm, reliable condition for supporting the super-imposed load of trailer 7 as well as having elevated the front end for facilitating disengagement of fifth wheel 6. The air brake system of tractor 1 is disunited from dependent trailer brake system, and the tractor may then be pulled away. Trailer 7 is thus in independently supported condition for loading or unloading operation and may remain in such parked condition for an indefinite period of time without danger of inadvertent or accidental pressure loss in landing gear support legs 11, 11', with attendant damaging collapse. Hydraulic fluid $h$ is trapped against escaping flow by the setting of the novel valves of the system and removal of tractor 1 denies any possibility of the supply of pressurized air to the system while the legs are so extended. However, it is, of course, obvious that if tractor 1 were in engaged relationship to trailer 7, the customary valves would efficiently close supply line 10 against the unauthorized ingress of air thereinto.

In order to return support legs 11, 11' to retracted position for road travel of trailer 7, the operator of tractor 1 will present same into position with respect to the parked trailer 7 and cause fifth wheel 6 to be interengaged as well as effect hook-up of the air brake system of the tractor to that of the trailer 7. Master control valve M is swung to the position shown in FIGURE 10, in order that air is directed from supply line 10 into valve H for effecting unseating of ball valve 66 to thus allow return of hydraulic fluid to supply tank 30 via conduit 37, passage 33, and conduit 36. Such operation of valve H will relieve the increased pressure of hydraulic fluid $h$ in cylinder 48, whereby the same will tend to move relatively upwardly with respect to the associated stems 45 under the super-imposed load. As described, air under line pressure is directed through air chambers 51 for egress through orifices 52 for action against the under face of end closures 50, to drive said cylinders 48 upwardly into fully retracted position as shown in FIGURE 10.

Thus, the foregoing demonstrates the complete cycle of operation of the hydro-pneumatic system of the present invention. It is, of course, obvious that divider valve D may be appropriately operated for selected flow of fluid $h$ to the stems 45 in order to equalize any inadvertent differential in load on trailer that might have developed thereon.

The present invention as applied to landing gears for tractor-trailer combinations may be utilized with existing trailer constructions without requiring any extensive alteration or modification of the trailer structure and, more particularly, through the uniqueness of booster cylinder C, the present invention is fully operable regardless of the particular line pressure of the air in the tractor air brake system.

Although, as stated, the present invention has been described particularly with respect to landing gears for trailers, the extreme versatility of the same is self evident, for it is equally adaptable to effecting operation of myriad types of work devices wherein a source of air under pressure constitutes the prime motivating force. Booster cylinder C thus assures applied elevation of the end pressure so that efficient functioning may be achieved despite the value of the air force pressure.

It should be understood that changes and modifications in the formation, construction, arrangement, and combination of the several parts of the Hydro-Pneumatic System may be made and substituted for these herein shown and described without departing from the nature and principle of my invention.

Having thus described my invention, what I claim and desire to secure by Letters Patent is:

1. A hydro-pneumatic system comprising a source of air under predetermined line pressure, a source of hydraulic fluid having an inlet and an outlet, first conduit means connecting said source of air with said source of hydraulic fluid for motivating flow of said fluid therefrom under the air pressure, a work-performing element having a slideable piston with a piston head, second conduit means connecting said source of hydraulic fluid with said piston head for effecting movement of the same into operative position, a non-return valve provided adjacent said fluid source outlet, a release valve having first and second chambers, said first chamber being in communication with said second conduit means between said non-return valve and said work-performing element, third conduit means connecting said first chamber of said release valve and the inlet of said hydraulic fluid source for return flow of fluid thereto, fourth conduit means connecting said piston with said source of air for effecting movement of the same into inoperative position and connecting said second chamber of said release valve with said source of air for introduction of the same into said second chamber when the same is applied against said piston, a valve member provided slideably within said release valve and being urged into closed condition within said first chamber by hydraulic fluid therein to prevent unauthorized flow of fluid from said work-performing element through said third conduit means to the inlet of said source of hydraulic fluid, said valve member being further adapted for movement into valve-open condition by the pressure of air admitted into said second chamber through said fourth conduit means thereby inducing return fluid flow, a unitary control valve having first, second and third valve portions, said first valve portion being located within the path of said first and fourth conduit means, said second valve portion being located within the path of said fourth conduit means, and said third valve portion being located within the path of said third conduit means, and means for controlling the operation of said control valve for selected opening and closing of the aforesaid conduit means.

2. A hydro-pneumatic system comprising a source of air under predetermined line pressure, a source of hydraulic fluid having an inlet and an outlet, first conduit means connecting said source of air with said source of hydraulic fluid for motivating flow of said fluid therefrom under the air presure, a work-performing element having a slideable piston with a piston head, second conduit means connecting said source of hydraulic fluid with said piston head for effecting movement of the same into operative position, a non-return valve provided adjacent said fluid source outlet, a release valve having first and second chambers, said first chamber being in communication with said second conduit means between said non-return valve and said work-performing element, third conduit means connecting said first chamber of said release valve and the inlet of said hydraulic fluid source for return flow of fluid thereto, fourth conduit means connecting said piston with said source of air for effecting movement of the same into inoperative position and connecting said second chamber of said release valve with said source of air for introduction of the same into said second chamber when the same is applied against said piston, a valve member provided slideably within said release valve and being urged into closed condition within said first chamber by hydraulic fluid therein to prevent unauthorized flow of fluid from said work-performing element through said third conduit means to the inlet of said source of hydraulic fluid, said valve member being further adapted for movement into valve-open condition by the pressure of air admitted into said second chamber through said fourth conduit means thereby inducing return fluid flow, a control valve located wtihin the paths of said first, third, and fourth conduit means, means for shifting said control valve into first and second positions, whereby in said first position said control valve:

(a) closes the fourth conduit means with said source of air for inducing movement of the valve member into valve closed condition by the force of the hydraulic fluid pressure in said first chamber of said release valve to establish fluid flow from said fluid source to said piston head, (b) closes said third conduit means to prevent unauthorized return fluid flow, and (c) opens said first conduit means to cause flow of hydraulic fluid to said piston head, and whereby in said second position said control valve (d) opens said fourth conduit means for simultaneously permitting application of air under pressure against said valve member for opening the release valve to induce return fluid flow and against said piston for movement into inoperative position, (e) opening said third conduit means for return flow of fluid to its source, and (f) closing said first conduit means to said source of air and opening same to the atmosphere.

3. A hydro-pneumatic system as defined in claim 2 and further characterized by a pressure boosting device for increasing the pressure hydraulic fluid acting on the pressure head above the line pressure of the air, said device having first and second compartments, means connecting said non-return valve and the first compartment of said pressure boosting device, fifth conduit means connecting the second compartment of said pressure boosting device and said source of air under pressure, an air flow control member interposed in said fifth conduit means for selectedly permitting connection between said second compartment of said pressure boosting device and said source of air as well as between the said second compartment and the atmosphere, and a valve element slideably mounted within said pressure boosting device for subjection at its opposite ends to the hydraulic fluid in the first compartment and the air in the second compartment.

4. A hydro-pneumatic system as defined in claim 2 and further characterized by a pressure boosting device having first and second compartments, the cross section of said second compartment being of a predetermined extent greater than the cross section of said first compartment, flow means connecting said non-return valve and said first compartment of said pressure-booster device, fifth conduit means connecting the second compartment of said pressure boosting device with said source of air under pressure, said first and second compartments being coaxial, a piston member disposed slideably in said device and having an enlarged head portion located within said second compartment for application against the end face thereof of air under pressure and a relatively narrow stem portion disposed within said first compartment for subjection of its end surface by fluid entering said first compartment, said stem being of such length relative to said first compartment as to act as a seal to prevent unauthorized flow of said fluid into said second compartment, an air flow control member interposed in said fifth conduit means for selectedly permitting connection between said second compartment and said source of air and between said second compartment and the atmosphere.

5. A hydro-pneumatic system comprising a source of air under predetermined line pressure, a source of hydraulic fluid having an inlet and an outlet, first conduit means connecting said source of air with said source of hydraulic fluid for motivating flow of said fluid therefrom under the air pressure, a work-performing element having a slideable piston with a piston head, second conduit means connecting said source of hydraulic fluid with said piston head for effecting movement of the same into operative position, a non-return valve provided adjacent said fluid source outlet, a release valve having first and second chambers, said first chamber being in communication with said second conduit means between said non-return valve and said work-performing element, third conduit means connecting said first chamber of said release valve and the inlet of said hydraulic fluid source for return flow of fluid thereto, fourth conduit means connecting said piston with said source of air for effecting movement of the same into inoperative position and connecting said second chamber of said release valve with said source of air for introduction of the same into said second chamber when the same is applied against said piston, a valve member provided slideably within said release valve and being urged into closed condition within said first chamber by hydraulic fluid therein to prevent unauthorized flow of fluid from said work-performing element through said third conduit means to the inlet of said source of hydraulic fluid, said valve member being further adapted for movement into valve-open condition by the pressure of air admitted into said second chamber through said fourth conduit means thereby inducing return fluid flow, a system control valve, a pressure boosting device having first and second compartments, flow means connecting said non-return valve and the first compartment of said pressure boosting device for flow of hydraulic fluid thereinto, fifth conduit means connecting the said second compartment of the pressure boosting device and said source of air under pressure through said control valve, a piston slideably provided within said pressure boosting device for subjection at one end by hydraulic fluid in said first compartment and at its other end by air in said second compartment, an air flow control valve interposed in said fifth conduit means between said pressure boosting device and said system control valve for selectedly permitting connection between said pressure boosting device second compartment and said source of air and between said second compartment and the atmosphere, said control valve being located within the path of said first, third and fourth conduit means as well as said fifth conduit means, means for shifting said control valve into first, second and third operating positions whereby in said first position said control valve:

(a) closes the fourth conduit means with said source of air for inducing movement of the valve member into valve closed condition by the force of the hydraulic fluid pressure in said first chamber of said release valve to establish fluid flow from said fluid source to said piston head, (b) closes said third conduit means to prevent unauthorized return fluid flow, (c) opens said first conduit means to cause flow of hydraulic fluid to said piston head, and (d) closes said fifth conduit means to prevent air flow from its source to said air flow control member, and whereby in said second position said control valve (e) opens said fourth conduit means for simultaneously permitting application of air under pressure against said valve member for opening the release valve to induce return fluid flow and against said piston for movement into inoperative position, (f) opening said third conduit means for return flow of fluid to its source, (g) closing said first conduit means to said source of air and opening same to the atmosphere, (h) closes said fifth conduit means to prevent flow of air therethrough from said air source, and whereby in said third position said control valve (i) opens said fifth conduit means for flow of air from said source toward said second compartment of said pressure boosting device, (j) closes said fourth conduit means, (k) closes said third conduit means to prevent fluid return flow, and (l) opens said first conduit means.

(References on following page)

References Cited by the Examiner

UNITED STATES PATENTS

| | | | |
|---|---|---|---|
| 2,371,450 | 3/45 | Langdon | 60—51 |
| 2,403,912 | 7/46 | Doll | 60—52 |
| 2,455,747 | 12/48 | Fischer | 60—51 |
| 2,573,993 | 11/51 | Sedgwick | 60—52 |
| 2,837,312 | 6/58 | Troche | 280—150.5 X |
| 2,877,624 | 3/59 | Zoller | 60—51 |
| 2,926,889 | 3/60 | Obes | 280—150.5 X |
| 2,938,347 | 5/60 | Sturgis | 60—51 |

JULIUS E. WEST, *Primary Examiner.*

EDGAR W. GEOGHEGAN, *Examiner.*